United States Patent [19]

Goossens

[11] 4,385,859
[45] May 31, 1983

[54] STORAGE INSTALLATION PERMITTING THE AUTOMATIC SELECTION AND REMOVAL OF ARTICLES

[76] Inventor: Willy P. M. Goossens, Zeedijk, 19, B-8380 Zeebrugge, Belgium

[21] Appl. No.: 190,382

[22] Filed: Sep. 24, 1980

[30] Foreign Application Priority Data

Sep. 25, 1979 [DE] Fed. Rep. of Germany ....... 2938757
Sep. 30, 1980 [BE] Belgium .................................. 201966

[51] Int. Cl.$^3$ .......................... B65G 1/33; B65G 65/00
[52] U.S. Cl. ..................................... 414/267; 193/32; 198/424; 198/534; 414/268; 414/274; 414/278
[58] Field of Search ............. 211/49 D, 184; 414/285, 414/267, 273, 278, 268, 274, 277; 198/424, 534; 193/32, 27

[56] References Cited

U.S. PATENT DOCUMENTS

| 670,222 | 3/1901 | Campbell | 193/32 |
| 3,337,069 | 8/1967 | Burger | 414/278 |
| 3,405,818 | 10/1968 | Humenuk | 414/267 X |

FOREIGN PATENT DOCUMENTS 1182621 12/1964 Fed. Rep. of Germany ........ 193/32

Primary Examiner—Sherman D. Basinger

[57] ABSTRACT

Storage installation permitting the automatic selection and removal of articles stored at different levels on carrying elements of one or more shelf units, each carrying element (5) being fitted with a device for transporting the articles and with an individual and self-governing control member (6) for actuating this transporting device. The articles removed in this way can be grouped and moved by a common transporting means towards a central packaging and distributing station.

12 Claims, 4 Drawing Figures

STORAGE INSTALLATION PERMITTING THE AUTOMATIC SELECTION AND REMOVAL OF ARTICLES

BACKGROUND OF THE INVENTION

The present invention relates to storage installations permitting the automatic selection and removal of articles, such as, for example, pharmaceutical products.

These articles are stored on shelving composed of several units which can be grouped and joined together as required.

This shelving is fitted with plates or other supporting elements, which are arranged at different levels and divided up over their length by a series of carrying elements of different width, in which the stored articles can slide.

Installations exist in which each carrying element is fitted with a device making it possible to move the article forward, as described, for example, in German Application DE-AS No. 1,449,152, first published on Jan. 15, 1970.

This device consists of a pushing member which can move along the carrying element when it is actuated by a control mechanism. This control mechanism moves horizontally and vertically along the front side of the shelving in order to remove one article at a time.

In a storage installation in which there are a large number of different articles to be removed, it is obvious that a device such as described in the above-mentioned application no longer meets the requirements in view of the time required for positioning the control device and actuating each carrying element for the selected product.

Furthermore, these installations must have a rigid and bulky structure, in particular for the part comprising the device for controlling and removing the articles, which are located on the same front side of the shelving.

The stocking of articles in an installation of this type is also very difficult and makes it necessary to stop the installation in order to retract the pushing member with the aid of a special apparatus.

BRIEF SUMMARY OF THE INVENTION

The object of the present invention is to overcome all these disadvantages.

For this purpose, the storage installation according to the invention comprises a shelf unit in which each carrying element comprises an individual and self-governing control member for actuating the device for transporting the articles to be removed.

This individual control member can be, for example, a hydraulic or pneumatic jack fitted with a feed mechanism or an electric motor. The articles are preferably transported with the aid of a conveyor belt moving along the carrying element. The carrying elements are produced from profiles permitting modular assembly which can be adapted to the dimensions of the articles to be stored. A series of fixed or detachable inclined planes can be provided in order to break the fall of the articles removed in this way.

The various control members are connected in a manner which is in itself known to a central control unit, such as a computer.

The storage installation according to the invention will be described in greater detail below, with reference to the drawings which show embodiments:

DETAILED DESCRIPTION OF THE DRAWINGS

Figure 1:
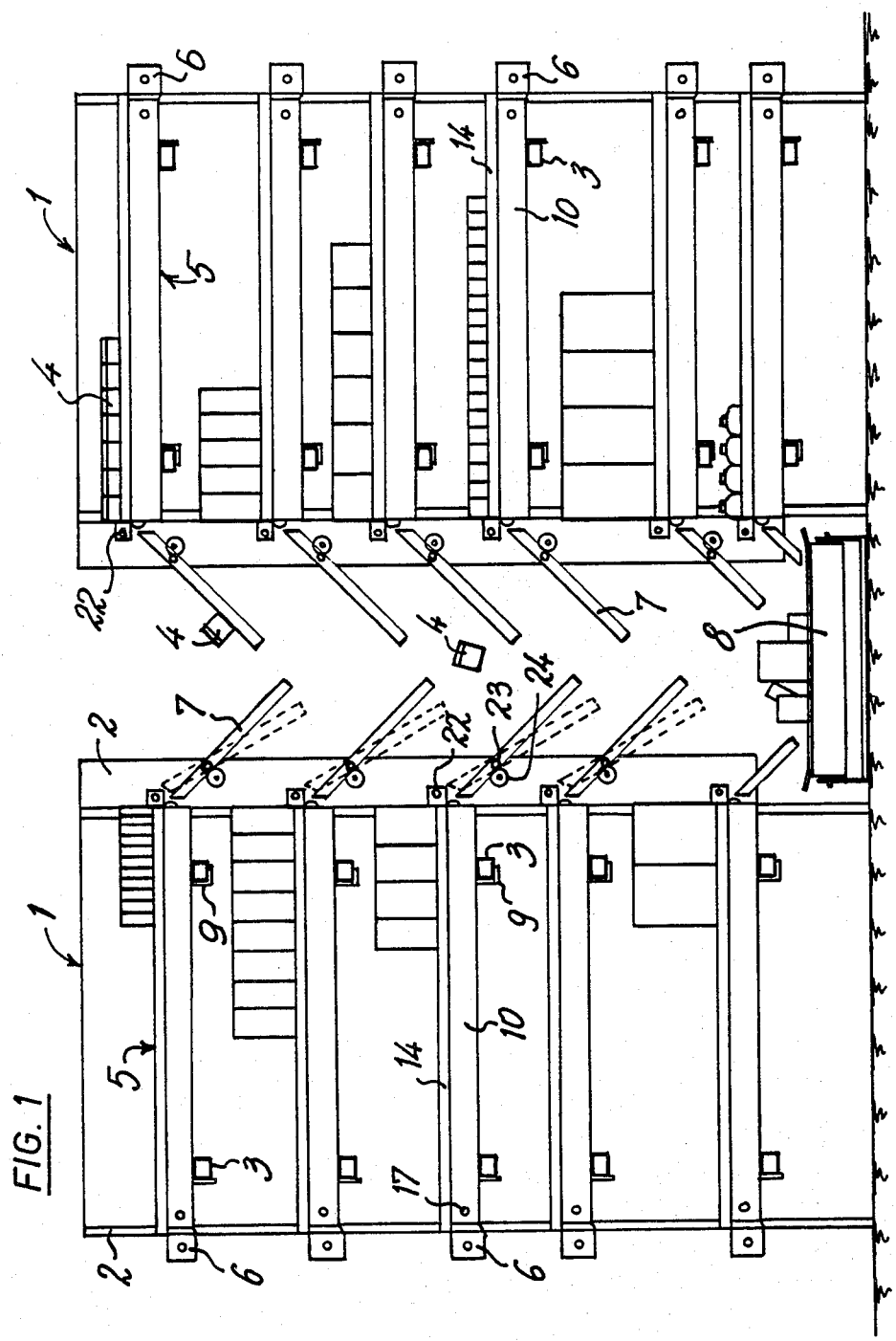
FIG. 1 is a view in cross-section of a shelf unit fitted with the device forming the subject of the invention.

The shelving 1 comprises uprights or walls 2 and also girders or longitudinal beams 3, arranged at various appropriate levels to the height of the articles 4.

The articles 4 are stored on carrying elements 5 mounted side by side on the longitudinal beams 3.

As will be described in greater detail below, each carrying element 5 is provided with a transporting device consisting of a belt which is kept under constant tension by rollers mounted at the ends of each carrying element 5.

According to the invention, the transporting device of each carrying element 5 can be actuated by an individual and self-governing control member 6.

As can be seen, different carrying elements 5 can be actuated simultaneously by their own control members 6. Each carrying element 5 is advantageously fitted with hooking means 9 on the girders or longitudinal beams 3.

Preferably, provision is made for the front faces of a pair of shelf units 1 to be directed towards one another (FIG. 1) so that the fall of the articles 4 stored on the upper carrying elements is broken each time by the successive inclined planes 7 of the lower carrying elements of the same shelf units and of the opposite shelf unit. The articles 4 then arrive on a common conveyor belt 8 which is arranged between two facing shelf units and is located at a lower level than the level of the lowest carrying elements.

The common conveyor belt 8 leads the removed articles towards a packaging and distributing station.

Figure 2:
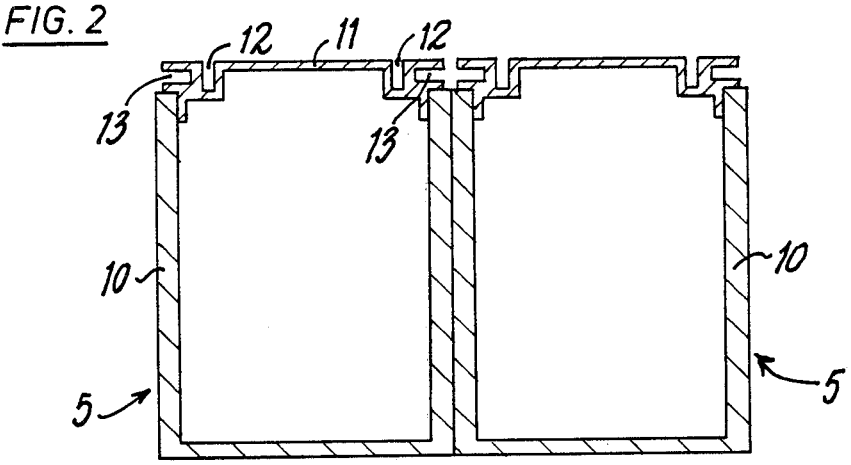
FIG. 2 is a view in cross-section of two juxtaposed carrying elements.
Figure 4:
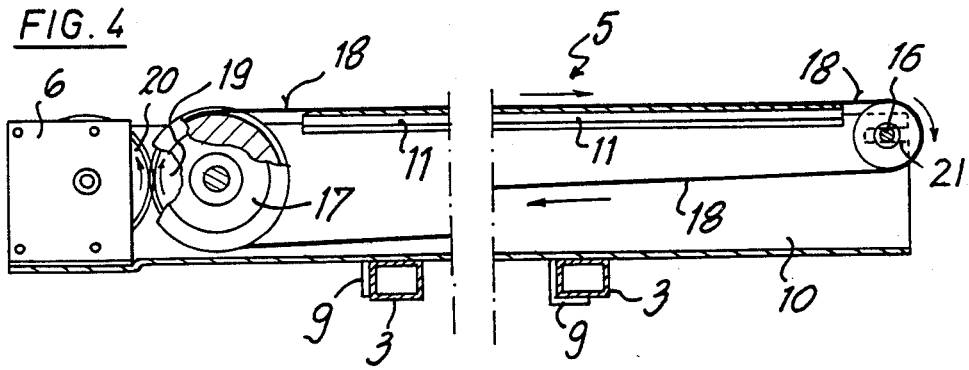
FIG. 4 is a view in longitudinal section of a carrying element.

FIGS. 2 and 4 show the construction of a carrying element 5 in greater detail.

Each carrying element 5 consists of a U-shaped body 10, the opening of which is closed by a profiled cover 11.

This cover 11 is provided with vertical longitudinal grooves 12 and horizontal longitudinal grooves 13 so that modular assembly can be carried out by juxtaposition (FIG. 3), which makes it possible to obtain paths, for transporting articles, which have different widths adapted to each article. Lateral guide walls 14, delimiting the width of the paths, can be arranged in the vertical grooves 12, and spacers 15, or closure walls, for articles of large dimensions can be arranged in the horizontal grooves 13.

The axles of the tensioning roller 16 and of the roller 17 for driving a conveyor belt 18 are housed between the lateral walls of the body 10. The rollers 16 and 17 are of slightly concave shape.

A toothed ring 19 of the drive roller 17 engages directly with a toothed ring 20 of an individual control member, such as an electric motor/step-down gearbox set 6.

On the front side, the belt 18 passes over the tensioning roller 16 of small diameter, which is mounted in a known manner in a fork 21 subjected to the constant action of compression springs and adjusting screws (not shown).

The articles are arranged behind one another on each carrying element 5. When the control member is actuated, the conveyor belt 18 starts to move and the first article located near the tensioning roller 16 tilts and falls onto the corresponding inclined plane 7. When it tilts, the selected article 4 cuts off a light signal of a photoelectric cell 22 provided for this purpose in the vicinity of the tensioning roller 16, thus making it possible to count the number of articles removed and to stop the forward movement of the belt 18. The number of articles removed can thus be recorded for each carrying element and the state of the stock in the warehouse can be obtained at any time by querying the memory of a computer running the whole system.

Figure 3:
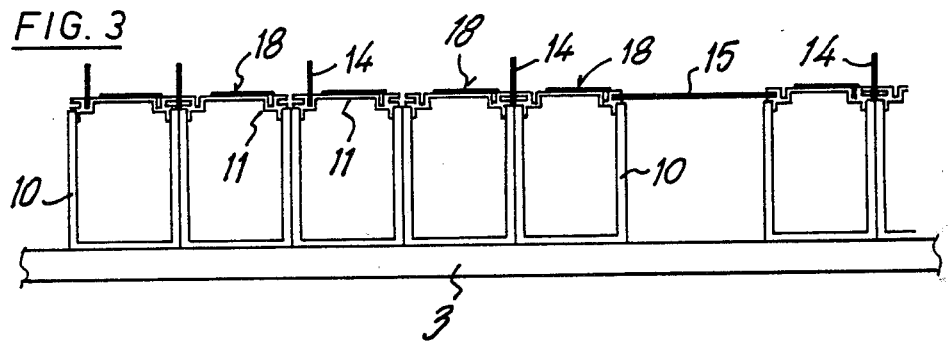
FIG. 3 is a view in cross-section of a modular set of carrying elements.

In the case of articles of large dimensions, they can be supported by two carrying elements each having its drive motor 6 and its conveyor belt 18. However, the axles of the drive rollers 17 will be connected to one another so as to achieve a uniform forward movement of the two belts 18. The two carrying elements will be connected by a horizontal spacer 15 of a suitable size, as illustrated in FIG. 3.

As also shown in FIG. 1, the articles which fall cannot remain wedged between two opposite inclined planes.

In fact, as soon as an article 4 has left one of the carrying elements 5 and has therefore passed in front of one of the photoelectric cells 22, the inclination of the inclined planes 7 changes. For this purpose, each inclined plane 7 is mounted so as to be able to tilt between a pair of uprights or walls 2, about an axle 23, in order to take up a position shown in broken lines in FIG. 1. This tilting takes place with the aid of a motor 24, which is preferably provided individually for each inclined plane. Subsequently, each inclined plane 7 returns to its initial position shown in solid lines. The system is programmed so that the passage, in front of a photoelectric cell 22, of the last article of a series constituting a complete order successively actuates all the inclined planes 7, always starting with the upper inclined plane and ending with the lowest. As long as all the inclined planes have not returned to their initial position, no other article 8 belonging to another order can be caused to pass in front of one of the photoelectric cells 22.

The advantages of the present invention are:

speed of removing a large number of different articles;

ease of supplying the carrying elements from the rear, in a continuous manner, without stopping the installation;

for articles of high consumption, it is possible to provide two or more carrying elements aligned behind one another, in order to increase the independence of the installation;

for maintenance of a carrying element, it can be removed from the shelving and, if appropriate, replaced without stopping the operation of the installation;

high adaptability of the carrying elements to the nature and to the dimensions of the articles; and the stock of articles in the warehouse is continuously recorded and can be consulted at any time by querying the memory of the computer running the whole system.

The installation described above is an embodiment according to the invention, but it is self-evident that modified embodiments are always possible without going outside the scope of the invention. Thus, for example, it is possible to produce an installation according to FIG. 1, without the inclined planes 7 but with a central conveyor belt 8 of adjustable height, which can collect the articles at the various levels and deliver them when the conveyor has returned to its lowest position.

An equivalent installation can be produced as an automatic public store for articles of high consumption, by providing a horizontal plane, or girder, which moves vertically in order to collect the selected articles at the various levels. When this horizontal plane, or girder, returns to its lowest level, the user can gain access to the removed articles by opening a door. The opening movement of the access door causes an internal wall to take up a position which prevents access to unselected articles.

In the same spirit, it is also possible to provide an embodiment in which the articles leave towards the rear (motor at the front) and fall onto a lower conveyor or inclined plane which returns the selected articles to the front of the store, where they are freely accessible to the customer.

I claim:

1. Storage installation permitting the automatic selection and removal of articles stored at different levels on carrying elements of one or more shelf units, each carrying element being fitted with a device for transporting the articles, and the articles removed in this way being grouped and moved by a common transporting means towards a central packaging and distributing station, characterized in that each carrying element (5) comprises a substantially U-shaped body (10) which is closed by a profiled cover or plate (11) provided with longitudinal grooves in the vertical plane (12) and in the horizontal plane (13) so as to be able to carry out modular assembly of the transporting paths, adapted to the dimensions of the articles, and an individual and self-governing control member (6) for actuating the device for transporting the articles to be removed.

2. Storage installation according to claim 1, in which the articles (4) are moved on the carrying elements (5) with the aid of at least one conveyor belt (18), characterized in that the conveyor belt (18) is held and tensioned on either side of the carrying element (5) by at least two rollers, namely a tensioning roller (16) and a drive roller (17) of slightly concave shape, and in that the upper part of the belt (18) is supported by the plate (11), and in that said conveyor belt (18) is actuated by an electric motor (6).

3. Storage installation according to claim 1 or 2, characterized in that lateral guide walls (14) can be arranged in the vertical grooves (12) in the plate (11) and spacers (15), or closure walls, for articles of large dimensions, can be arranged in the horizontal grooves (13).

4. Storage installation according to claim 2, characterized in that the tensioning roller (16) of each carrying element (5) is supported by an axle which is housed in forks (21) provided in lateral walls of the body (10), and in that it is subjected to the action of compression springs and adjusting screws, which make it possible to achieve a constant tension of the belt (18).

5. Storage installation according to claim 1, characterized in that the removal of each article (4) stored on a carrying element (5) is controlled by one or more photoelectric elements or other current-breaking elements, arranged in the falling or tilting path of the article on an inclined plane (13).

6. Storage installation according to claim 1, characterized by girders or longitudinal beams (3) supporting a series of carrying elements (5) which are extended on the discharge side by inclined planes (7) which cooperate with each other in order to break the fall of the articles (4) coming from the upper carrying elements (5).

7. Storage installation according to claim 6, characterized in that it comprises a device (23-24) for varying the inclination of the inclined planes (7).

8. Storage installation according to claim 7, characterized in that the removal of each article (4) stored on a carrying element (5) is controlled by one or more photoelectric elements, and in that the device for varying the inclination of the inclined planes act immediately after any article has left one of the carrying elements (5) and has passed in front of one of the photoelectric elements (22).

9. Storage installation according to claim 8, characterized in that the device for varying the inclination of the inclined planes (7) is mounted between two uprights or walls (2), each inclined plane being able to tilt around an axle (23) and a suitable device being provided for controlling this tilting.

10. Storage installation according to claim 9, characterized in that it comprises a motor (24) suitable for tilting the inclined planes (7).

11. Storage installation according to claim 9, characterized in that it comprises an individual motor (24) for tilting each inclined plane (7).

12. Storage installation according to claim 11, characterized in that the passage, in front of a photoelectric element (22), of the last article of a series constituting a complete order instructs the motors (24) of the successive inclined planes (7) to modify their inclination so as to let through articles which may be wedged between two opposite planes, always starting with the upper inclined planes and ending with the lowest, it being impossible for any other article belonging to another order to be caused to pass in front of a photoelectric element (22) as long as all the inclined planes actuated in this way have not returned to their initial position.

* * * * *